Nov. 13, 1928.
C. B. McDONALD
1,691,779
VALVE TAPPET AND METHOD OF FORMING THE SAME
Filed March 19, 1928
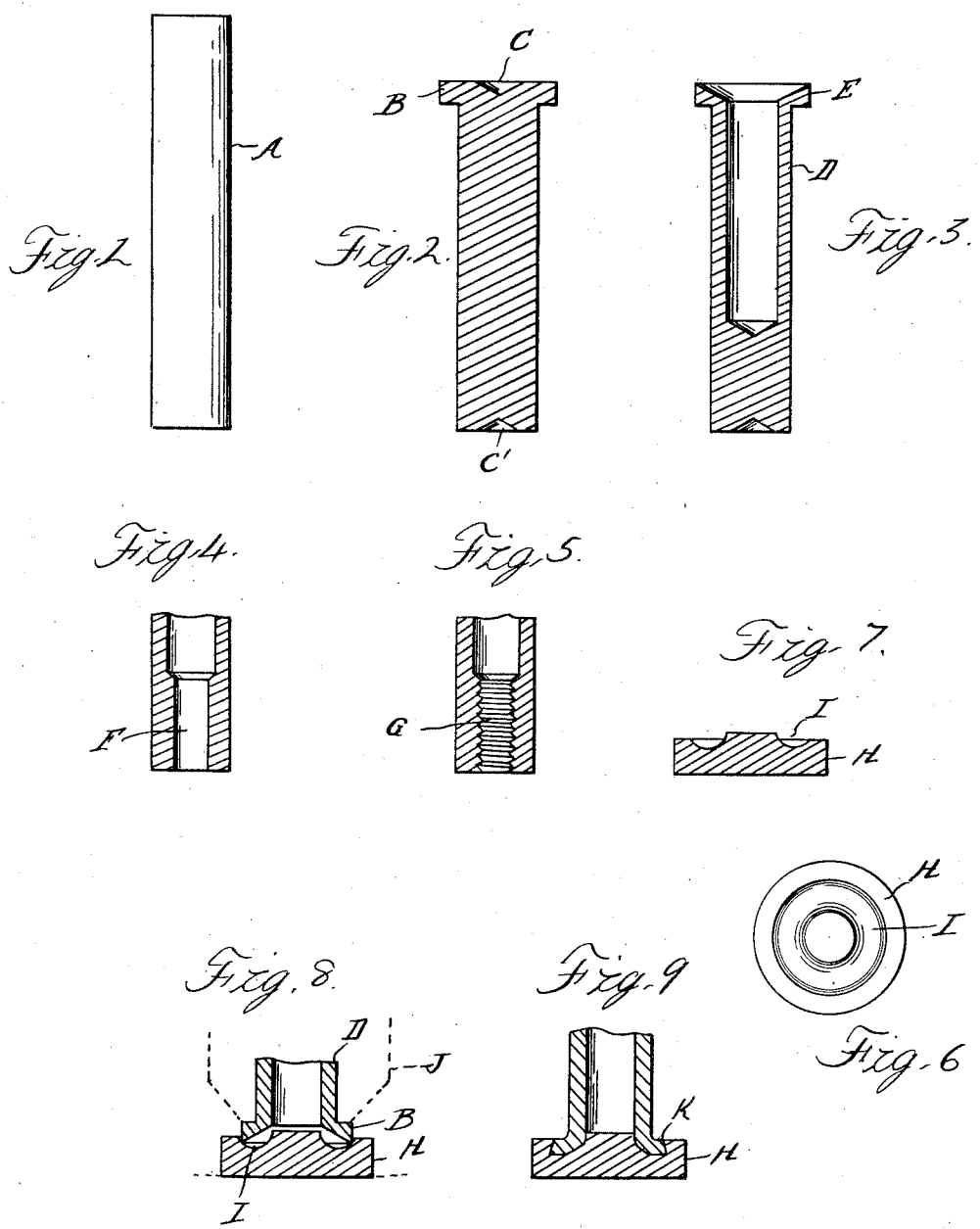
Inventor
Charles B. McDonald Patented Nov. 13, 1928.

1,691,779

UNITED STATES PATENT OFFICE.

CHARLES B. McDONALD, OF DETROIT, MICHIGAN, ASSIGNOR TO WILCOX PRODUCTS CORPORATION, OF DETROIT, MICHIGAN, A CORPORATION OF MICHIGAN.

VALVE TAPPET AND METHOD OF FORMING THE SAME.

Application filed March 19, 1928. Serial No 262,933.

The invention relates to the manufacture of headed articles such as valve tappets where the head and stem portions are formed of different materials. More specifically the invention relates to a process by which the head can be formed of hard cast iron and the stem of steel.

It is an object of the invention to obtain a construction in which these dissimilar metals are effectively integrated and in which the hard cast iron is reinforced and strengthened by the softer material.

It is a further object to obtain a simple process of forming and uniting these parts as hereinafter set forth.

In the drawings;

Figure 1 is an elevation of the rod from which the stem is formed;

Figures 2, 3, 4, and 5 are longitudinal sections showing the successive steps in forming a shank.

Figure 6 is a plan view.

Figure 7 is a cross section of the cast head.

Figure 8 shows the stem and head as placed together preparatory to electrically welding the same.

Figure 9 is a section through the stem and head after being welded.

The materials from which my improved construction are formed are preferably white cast iron for forming the head portion and steel having a suitable carbon content for forming the stem. As shown in Figure 1 a round steel rod or bar A is severed to the proper length and is then upset to form the head B as illustrated in Figure 2. During this upsetting operation the opposite ends of the bar have centered recesses C and C' formed therein for guiding the entrance of the drills used in boring the blank. The boring is preferably in two separate operations, first from the head end to form a shell or tube D with a proper wall thickness. The head B is also machined to form a tapering or reducing cross section preferably termined at the periphery as indicated at E. The blank is then bored from the opposite end with a hole of smaller dimension shown at F Figure 4 and this hole is tapped as indicated at G.

The head H is as before stated, formed of white cast iron and is fashioned in the form of a disk having an annular groove or recess I in one face thereof. The scale formed in casting is removed and particularly in the groove I so as to leave a bright or clean metal surface for contact in welding.

Before uniting the stem and head the former is suitably heat treated to harden the same and the head is also heat treated to remove any strains incident to the casting. Also the head is preferably preheated before the welding process to avoid danger of cracking due to too rapid change in temperature.

The welding is effected by placing the head and stem together in the relation shown in Figure 8. The electrodes indicated in dotted lines at J, Figure 8 are also engaged with the members and during the passage of the current are pressed toward each other to force the head B into the recess I. On account of the reduced cross section the heat is first localized at the thin edge of the head B being at the same time communicated to the head H and raising the temperature of both metals to the fusing point. The pressure applied by the electrodes will then force the head B into the body of the member H as indicated at K Figure 9. During this pressure the conical face of the head B will be more or less flattened out so as to lie substantially parallel to the plane of the disk head H and enlarging the area of contact to a very considerable extent over the cross sectional area of the tubular stem. As the metal of the head B still retains its tensile strength and other inherent characteristics it will act as a reinforcement for the harder and more brittle metal forming the head H as well as enlarging the area of the joint. Also the heat incident to the welding process will draw the temper of the shank adjacent to the head thereby lessening its brittleness and avoiding the forming of a weak point where the stem joins the head.

The tappet is completed preferably by grinding the faces of the head H and stem D. The resulting structure is one having an extremely hard wearing surface for engagement with the cam also a sufficiently hard surface on the stem for engaging the bearing but with greatly increased strength over that of cast metal alone. On account of the strength and toughness of the stem, its walls may be reduced in thickness to obtain a minimum of weight and on account of the reinforcement of the head H by the portion K of the stem this head may also be reduced in thickness to diminish its weight.

What I claim as my invention is:

1. A tappet comprising a preformed disk head of white cast iron and a hollow or tubular stem having a laterally enlarged head portion welded to said disk and forming a reinforcement therefor.

2. The method of forming tappets comprising the separate forming of a cast iron disk head and a hollow or tubular stem having a reducing or tapering end portion, contacting said tapering end portion with said disk and passing electric current therethrough to develop a localized welding heat and pressing the parts together to embed said stem in said head.

3. The method of forming tappets comprising the separate forming of a cast iron disk head and a hollow or tubular stem having a reducing or tapering end portion, preheating said disk, contacting said tapering end portion of the stem with said preheated head, passing electrical current therethrough to produce a localized welding heat in the head and pressing the parts together to embed the end of said stem in said head.

4. A tappet comprising a preformed disk head of cast iron and a hollow or tubular stem having a laterally enlarged head portion welded to said disk and forming a reinforcement therefor.

5. A tappet comprising a preformed disk head and a hollow or tubular stem having a laterally enlarged head portion welded to said head and forming a reinforcement therefor, said head and stem being formed of dissimilar metals.

In testimony whereof I affix my signature.

CHARLES B. McDONALD.